United States Patent [19]
Bleiman

[11] 4,012,791
[45] Mar. 15, 1977

[54] DISK DRIVE APPARATUS

[75] Inventor: Lewis William Bleiman, Northridge, Calif.

[73] Assignee: Pertec Computer Corporation, Chatsworth, Calif.

[22] Filed: Oct. 24, 1974

[21] Appl. No.: 517,542

[52] U.S. Cl. ............................ 360/99; 360/105; 360/130

[51] Int. Cl.² .................. G11B 3/10; G11B 5/56; G11B 25/04

[58] Field of Search .............. 360/99, 86, 98, 97, 360/105–106, 130, 135; 206/444; 346/137; 274/39

[56] References Cited
UNITED STATES PATENTS

| | | | |
|---|---|---|---|
| 3,566,381 | 2/1971 | Buslik et al. | 360/98 |
| 3,770,908 | 11/1973 | Craggs | 360/97 |
| 3,814,441 | 6/1974 | Craggs | 360/99 |
| 3,879,757 | 4/1975 | Elliott | 360/130 |

OTHER PUBLICATIONS

B370,453, Jan. 1975, Hino et al., 360/99.

*Primary Examiner*—Alfred H. Eddleman
*Attorney, Agent, or Firm*—Lindenberg, Freilich, Wasserman, Rosen & Fernandez

[57] ABSTRACT

A flexible magnetic disk drive system including a read/write head carried by a carriage that is threadably engaged with a lead screw, but with the head carriage being free to pivot a fraction of a turn about the axis of the lead screw to move the head against and away from the disk.

9 Claims, 3 Drawing Figures

DISK DRIVE APPARATUS

BACKGROUND OF THE INVENTION

This invention relates to a disk data storage apparatus.

An increasingly important type of data storage system utilizes a flexible or "floppy" disk cartridge. This type of disk cartridge and a drive machine utilizing it is described in U.S. Pat. No. 3,678,481. In flexible disk drives, a pressure pad is applied opposite the data transfer head to insure intimate contact between the head and the disk. Both the head and pressure pad must be movable not only against and away from the disk, but must be movable radially so they can be positioned over any of the radially spaced record tracks on a disk. A simple mechanism which permitted both types of movements of the head and pressure pad would simplify the disk drive.

In order to minimize wear during contact of the head with the disk, it is desirable to apply the head to the disk only when data transfer is to take place. However, when a light duty motor is utilized to rotate the data disk, the sudden increase in torque load resulting when the head is moved against the disk, can result in angular movement or vibration of the disk which prevents accurate readout of data.

SUMMARY OF THE INVENTION

In accordance with one embodiment of the present invention, a disk file is provided which is of simple construction and which allows accurate data transfer with a light duty spindle motor. The apparatus includes a disk clamp that is continuously pressed against the disk cartridge, and a pressure pad and head which are intermittently moved against the disk when data transfer is to occur. The head is mounted on a head carriage that is threadably engaged with a lead screw that rotates to position the head at any one of a number of radially spaced tracks on a data disk. Although the head carriage is restrained from unlimited turning, it is allowed to pivot by a limited angle about the axis of the lead screw, to move the head against and away from the data disk. When the pressure pad and head move against the disk, some of the force of the disk clamp is removed, so that there is a minimal change in frictional drag on the disk and therefore torsional vibration of the light duty spindle motor is minimized.

The novel features that are considered characteristic of this invention are set forth with particularity in the appended claims. The invention will be best understood from the following description when read in conjunction with the accompanying drawings.

DESCRIPTION OF THE PREFERRED EMBODIMENTS

Figure 1:
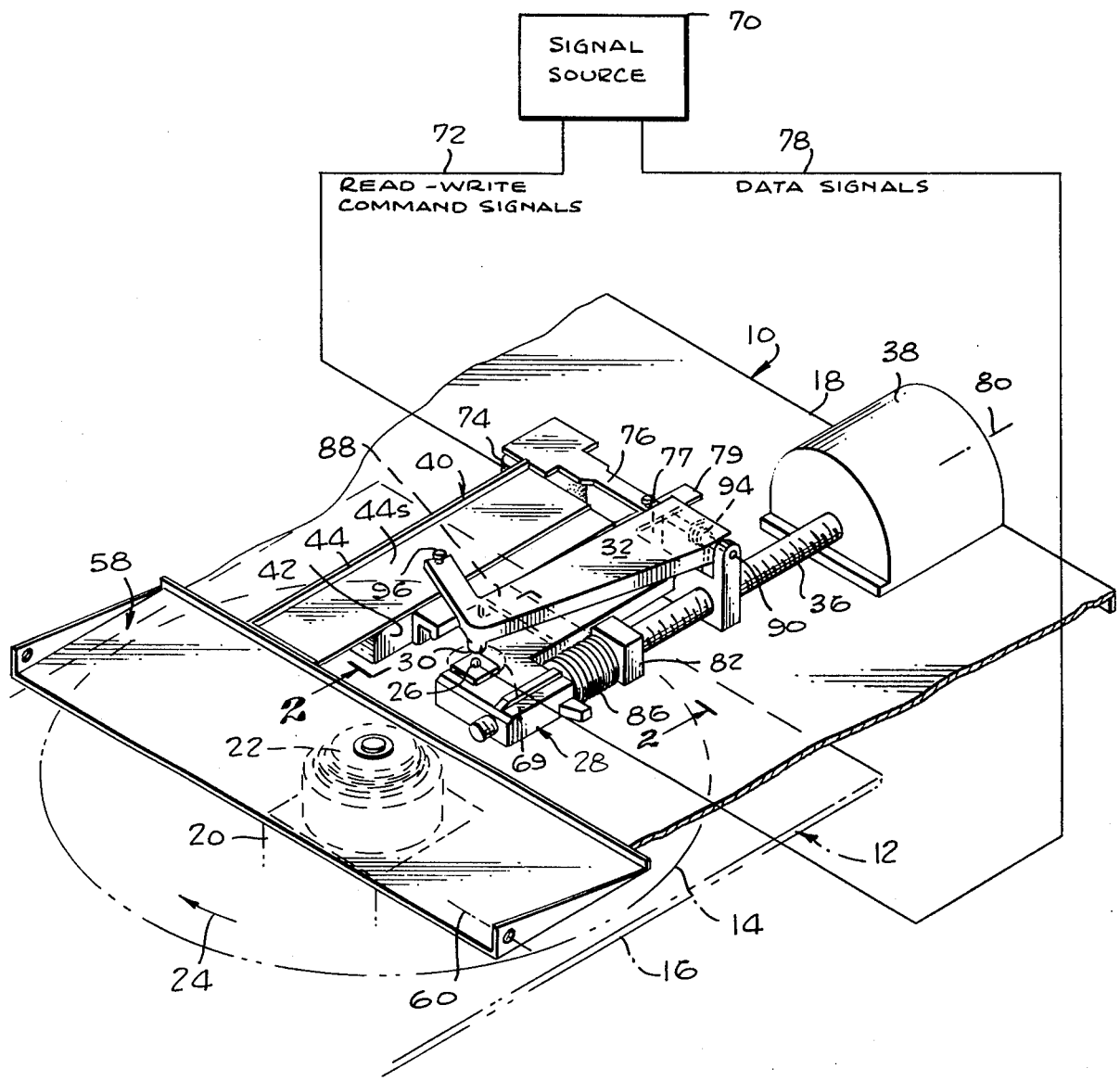
FIG. 1 is a partial perspective view of a disk file system constructed in accordance with one embodiment of the present invention.

FIG. 1 illustrates a flexible disk storage system which includes a disk file 10 and a disk cartridge 12 of a type that consists of a single flexible magnetic data disk 14 contained in a cartridge housing 16. The disk file includes a frame or chassis 18 which supports a spindle drive that includes a spindle motor 20 for rotating a spindle or hub 22 that can engage and rotate the data disk 14 in the direction indicated by arrow 24. Information transfer to the data disk is accomplished through a read/write head 26 which is mounted on a head carriage 28. The location where the head presses on the disk is backed up by a pressure pad 30 which is mounted on a pad holder 32. The pad holder 32 is, in turn, pivotally mounted on the head carriage 28, the holder and carriage forming a pad supporting means. The head 26 and pad 30 can be moved radially along the data disk to any desired data track thereon by a lead screw 36 which engages the head carriage 28 and which is rotated by a stepping motor 38 on the chassis. In order to maintain the flexible disc substantially flat, or wave-free, at the location where the head contacts the disk, a clamping means 40 is provided which is located up-path from the data transfer head 26. The clamping means includes a pair of members 42, 44 which can be pressed towards one another to squeeze the cartridge housing 16 so that internal pad 46 (FIG. 2) of the housing press against the disk with a low pressure which is sufficient to keep the disk portion which is being read, in a taut state.

Figure 3:
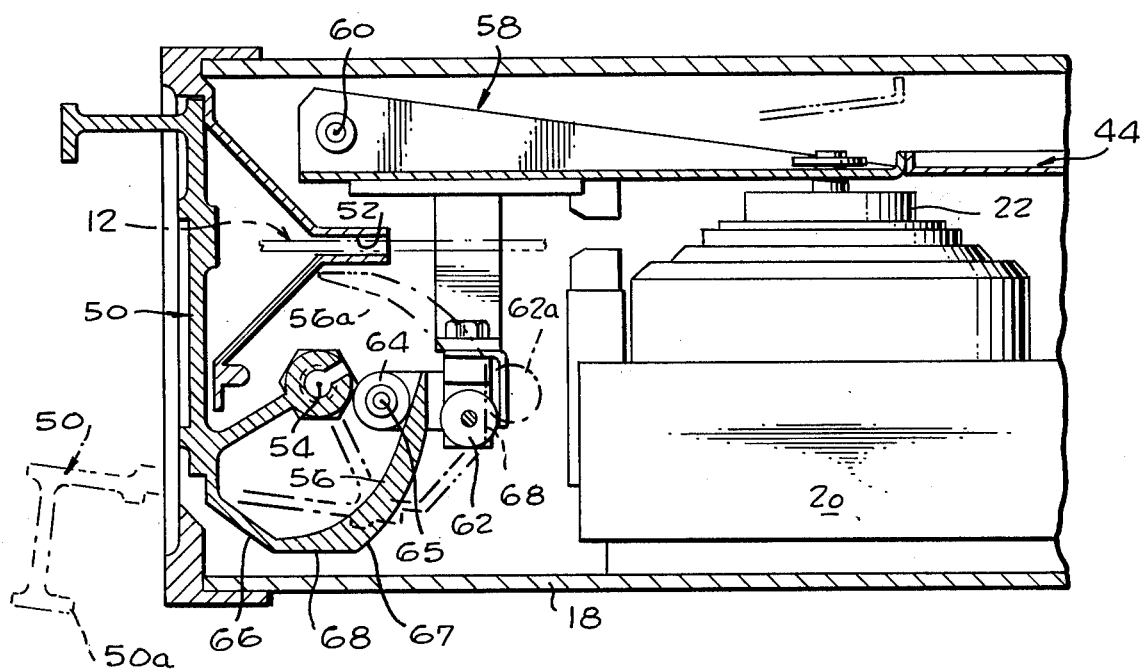
FIG. 3 is a partial sectional and side elevation view of the disk file system, showing the door cam mechanism.

As shown in FIG. 3, a disk cartridge can be inserted through a front end of the chassis 18 by opening a door 50 to allow insertion of the cartridge through a slot-like opening 52. The door 50, which is pivotally mounted about an axis 54, holds a cam 56 which can move a clamp holder 58. The clamp holder 58 is part of a clamp which also includes clamping member 44. Pivoting of the clamp holder can cause the member 44 to clamp the cartridge housing against the data disk, as described above. The clamp holder 58, which is pivotally mounted at 60 on the chassis, has a roller-type cam follower 62 which can be moved by the door-mounted cam 56. When the door is fully opened to the position 50a, the cam follower moves to the position 62a to lift the clamping member 44 so that the cartridge can be fully inserted into position. When the door is then closed, the clamp holder 58 is pressed down by reason of engagement of a second roller-type cam follower 64 with the other side of the cam 56. The second cam follower 64 is mounted on a long resilient axle 65, so that the cam follower 64 resiliently presses on the cam 56.

Figure 2:
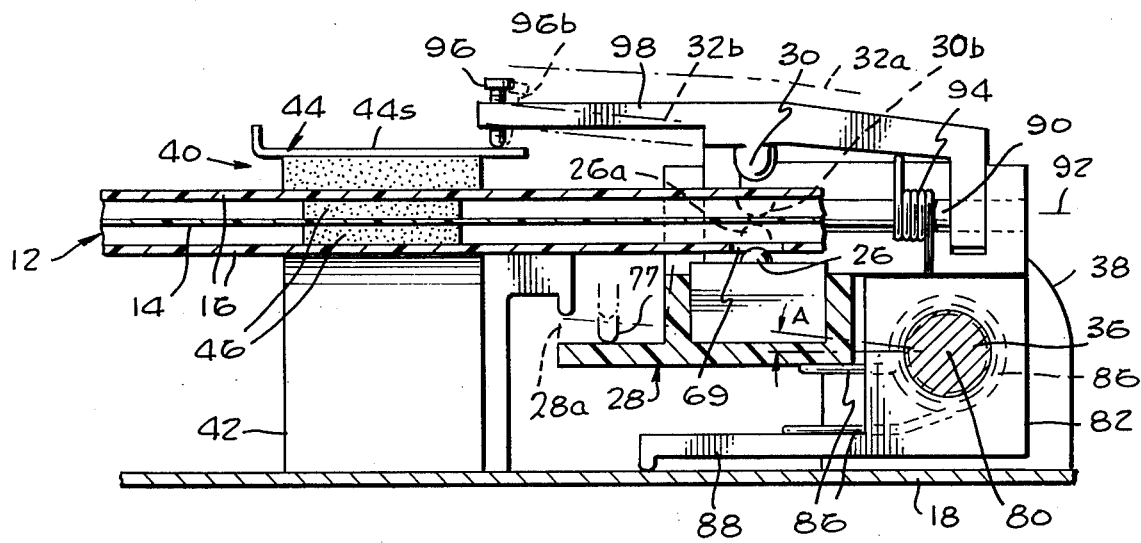
FIG. 2 is a view taken on the line 2—2 of FIG. 1.

The cam 56 is an elongated member with an elongated root portion 66 extending from the door. As the door 50 is opened, a thick cam portion 67 moves between the roller-type cam followers 62, 64 which are resiliently biased together by reason of the resilient axle 65. As a result, the cam follower 62 presses resiliently against the cam at position 56a. When the door is fully opened, a flat surface 68 of the cam presses against the cam follower at 62a, which serves to firmly keep the door opened until an operator forcefully closes the door. When the door is closed, the clamp holder 58 pivots back to its original position so that the clamp 44 presses down against the cartridge housing as shown in FIG. 2.

When a cartridge 12 has been inserted into the disk file, the spindle motor 20 is energized to rotate the data disk 14. However, the head 26 and pressure pad 30 are not moved against the disk through apertures 69 in the cartridge housing and against the data disk until it is desired to obtain signals from the disk or to delivery signals to the disk. When data transfer is to occur, a signal source 70 supplies a signal over a line 72 to a solenoid 74. Energization of the solenoid 74 causes an arm 76 and a screw 77 thereon to lift up. This releases an arm 79 on the head carriage 28, which causes the head 26 to move up and the pad 30 to move down, as will be described below. Soon afterwards, signals to be recorded may be transmitted over line 78 to the head 26.

The head carriage 28 can move not only along the length of the lead screw 36 as the screw rotates, but also can pivot about the axis 80 of the screw. The disk file mechanism includes an auxiliary carriage 82 which is threaded on the lead screw 36 and which is coupled by a torsion spring 86 to a forward portion of the head carriage 28. The torsion spring 86 tends to rotate the head carriage relative to the auxiliary carriage 82, so that the head 26 moves up against the data disk. The auxiliary carriage 82 is prevented from rotating away from the head carriage (in a counterclockwise direction as seen in FIG. 2) by reason of engagement of an arm 88 on the auxiliary carriage with the chassis 18. A relatively long arm 88 is utilized so that its tip presses with a light force against the chassis 18 and therefore produces only a small frictional drag when the head and auxiliary carriages are shifted in position by the lead screw.

Although the head carriage 28 can pivot about the axis 80, it pivots by only a limited angle A in moving the head up against the disk at the position 26a. The auxiliary carriage 82 moves radially towards and away from the disk center with the head carriage 28, so that a constant spring force is applied at all radial positions of the head track, utilizing a relatively simple biasing mechanism.

When the release solenoid 74 is energized to allow the head carriage 28 to pivot up, the pad holder 32 should be allowed to pivot down to bring the pad 30 against the data disk. Such movement of the pad is accomplished automatically by the present mechanism. The pad holder 32 is pivotally mounted on the head carriage 28 on a shaft or axle 90 with an axis at 92. A holder-biasing torsion spring 94 urges the pad holder to pivot down, but a screw 96 at the end of a restraining portion in the form of an arm 98 on the pad holder prevents free downward movement of the pressure pad because the screw 96 bears against the upper, or limit surface 44s of the clamping member 44. When the head carriage 28 pivots to the position 28a, the pad carriage tends to pivot to the position 32a at which position the screw 96 would be lifted far off the the clamping member 44. This permits the pad holder at 32a to pivot down to the position 32b where the downward pivoting is limited by reason of contact of the pressure pad at 32b with the data disk 14. (The screw at 96a does not contact the clamping member 44). Thus, release of the pressure pad holder 32 to permit the pressure pad to move against the data disk, occurs automatically when the head carriage pivots to move the head against the data disk.

The spindle drive motor 20 is a stepping motor which is closely controllable and of relatively low cost, but which can lead to low frequency torsional oscillations of the data disk if the torsional load is suddenly changed. Low frequency torsional oscillations of appreciable magnitude must be prevented during data transfer in order to assure accurate data transfer. The disk file system is constructed to minimize changes in torsional loading when the head 26 and pressure pad 30 are suddenly released to bear against the data disk, by providing for a corresponding reduction in frictional drag on the data disk. This is accomplished by the fact that when the pad holder 32 is released to pivot the pad against the disk, the screw 96 which has been pressing against the clamping member 44 lifts away from the clamping member. As a result, there is a small reduction in the clamping force applied by clamping member 44 to the cartridge housing, and therefore there is a slight reduction in frictional drag at the clamping means 40. Although there may be some increase in frictional drag on the data disk when the pressure pad and head suddenly bear against the disk, the increase is minimized by the reduction in clamping force at the clamping means 40, so that torsional oscillations of the data disk are minimized.

Thus, the invention provides a relatively simple disk file system and one which minimizes changes in torsional loading of the data disk. A relatively simple mechanism is provided by utilizing a head carriage that is moved radially by a lead screw and which can pivot by a limited angle about the lead screw to move the head against and away from the data disk. A pressure pad holder is mounted on the head carriage so that it is automatically released to move the pressure pad against the data disk when the head carriage pivots the head against the data disk. Changes in torsional drag on the data disk are minimized because pad movement against the disk results in a partial release of clamping force at a position up-path from the pressure pad.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. Disk drive apparatus comprising:
   a chassis;
   motor means mounted on said chassis, including a spindle for holding a data disk at a predetermined data disk position and rotating it;
   a carriage drive including a drive motor mounted on said chassis and a lead screw coupled to said motor;
   a head carriage threadably engaged with said screw;
   a data transfer head mounted on said head carriage at a location spaced from the axis of said screw;
   a second carriage threadably engaged with said lead screw independently of said head carriage;
   means for pivoting said head carriage about said lead screw by a fraction of a turn, including spring means for urging the head carriage to pivot in a first direction to move said head against said data disk position, and selectively actuable electrical means for opposing said spring means to pivot said head carriage in a second direction to move the head away from the disk position;
   said spring means coupling said head and second carriages for urging them to rotate in opposite directions; and
   means for preventing rotation of said second carriage beyond a predetermined position under the force of said spring means.

2. The apparatus described in claim 1 including:

a pad holder pivotally mounted on said head carriage and a pressure pad mounted on said pad holder on a side of said data disk position opposite said head;

a holder-biasing spring urging said pad holder to pivot in a direction to move said pressure pad toward said data disk position;

means defining a limit surface;

said pad holder including a restraining portion engaging said limit surface to limit the movement of said pad holder under the biasing of said holder-biasing spring;

said limit surface spaced far enough from the axis of said lead screw, so that when said head carriage pivots far enough to move said head against said data disk position, said restraining portion lifts far enough away from said limit surface to permit said pad holder to move said pad against said data disk position.

3. A disk storage system comprising:

a chassis;

a spindle drive mounted on said chassis;

a data carriage including a flexible data disk coupled to said spindle drive and a housing surrounding said disk and having a plurality of access openings;

clamping means disposed on either side of said cartridge housing, for applying clamping forces to said disk to maintain a disk portion in a taut condition;

a pressure pad disposed down-path from said clamping means;

a data transfer head disposed opposite said pressure pad;

moving means for moving said pad and head together and apart through said access openings, to move both said pad and head against said disk and to move both said pad and head away from said disk; and means responsive to said moving means for reducing the clamping force applied by said clamping means to said disk when said pad and head are moved against said disk, whereby to maintain a more constant torsion drag.

4. The system described in claim 3 including:

a screw positioner mounted on said chassis, including a lead screw and a motor coupled to said lead screw to turn it;

a head carriage threadably engaged with said lead screw and free to pivot by a limited angle thereabout, so that the head carriage is advanced by the screw but also uses the screw as a pivot axle, said head being mounted on said head carriage at a position spaced from the axis of said lead screw, and said moving means includes a spring coupled to said head carriage and urging said head carriage to pivot in a direction that urges said head towards said data disk.

5. A data disk system comprising:

a chassis;

a spindle motor mounted on said chassis;

a spindle coupled to said spindle motor;

a data cartridge having a cartridge housing mounted on said chassis and a data disk in the cartridge coupled to said spindle, said spindle motor rotating said data disk in a predetermined direction;

a screw positioner including a motor mounted on said chassis and a lead screw coupled to the motor;

a clamp including an elongated clamp arm extending primarily parallel to said lead screw, and means for moving said arm towards and away from said data cartridge;

an auxiliary carriage threadably engaged with said lead screw;

means for preventing rotation of said auxiliary carriage in a first direction;

a head carriage threadably engaged with said lead screw independently of said auxiliary carriage, and being free to pivot a few degrees;

a data transfer head mounted on said head carriage;

a spring extending between said auxiliary and head carriages and urging said head carriage to pivot in a second direction opposite to said first direction, to move said head against said data disk;

solenoid means mounted on said chassis and controllably operable to pivot said head carriage in said first direction opposite to the biasing of said spring to hold said head away from the data disk; and a pad holder pivotally mounted on said head carriage and a pad fixed to said pad holder at a position downpath, along the direction of disk rotation, from said clamp, said pad holder having an arm lying over and normally supported by said clamp arm, so that raising of said clamp arm lifts said pad away from said data disk, while pivoting of said head carriage in said second direction lifts said pad holder off said clamping member so that the pad holder can move the pad against the data disk.

6. Disk drive apparatus comprising:

means for supporting a disk for rotation in a defined plane about a spindle axis;

carriage means mounted for movement toward and away from said spindle axis along a line oriented substantially parallel to said defined plane;

a data transfer head;

a pressure pad;

head mounting means mounting said data transfer head on said carriage means for movement toward and away from a first surface of said defined plane;

pad mounting means mounting said pressure pad on said carriage means for movement toward and away from a second surface of said defined plane;

said carriage means including spring means for urging said head and pad towards one another into engagement with said first and second surfaces, respectively; and selectively actuable means for opposing said spring means to move said head and pad away from said first and second surfaces, respectively.

7. The apparatus of claim 6 wherein:

said disk supporting means is constructed to support a flexible disk; and said pad and head are aligned to press against opposite sides of the same location on said disk, said spring means being the sole determinant of the force of said head and pad against said disk.

8. The apparatus of claim 6 wherein:

said carriage means is pivotally mounted about said line along which said carriage moves; and said pad mounting means is pivotally mounted on said carriage means.

9. The apparatus of claim 8 wherein:

said means for opposing said spring means includes a first device operable to pivot said carriage means about said line in a direction to move said data transfer head away from said plane of disk rotation; and said means for opposing said spring means also includes a limit surface engageable with a part of said pad mounting means, said limit surface being far enough from said line along which said carriage moves, that when said carriage means is pivoted by said first device said limit surface pivots said pad mounting means to move said pad away from said defined plane.

* * * * *